(12) United States Patent
Takahashi et al.

(10) Patent No.: US 10,763,712 B2
(45) Date of Patent: Sep. 1, 2020

(54) CONSEQUENT-POLE-TYPE ROTOR, ELECTRIC MOTOR, AND AIR CONDITIONER

(71) Applicant: Mitsubishi Electric Corporation, Tokyo (JP)

(72) Inventors: Ryogo Takahashi, Tokyo (JP); Tomoaki Oikawa, Tokyo (JP); Mineo Yamamoto, Tokyo (JP); Hiroyuki Ishii, Tokyo (JP); Hiroki Aso, Tokyo (JP); Junichiro Oya, Tokyo (JP); Yuto Urabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 11 days.

(21) Appl. No.: 16/319,503

(22) PCT Filed: Aug. 22, 2016

(86) PCT No.: PCT/JP2016/074366
§ 371 (c)(1),
(2) Date: Jan. 22, 2019

(87) PCT Pub. No.: WO2018/037449
PCT Pub. Date: Mar. 1, 2018

(65) Prior Publication Data
US 2019/0386530 A1    Dec. 19, 2019

(51) Int. Cl.
*H02K 21/12* (2006.01)
*H02K 1/27* (2006.01)
*H02K 7/00* (2006.01)

(52) U.S. Cl.
CPC .......... *H02K 1/2706* (2013.01); *H02K 7/003* (2013.01)

(58) Field of Classification Search
CPC .......... H02K 1/276; H02K 15/03; H02K 1/27; H02K 1/2706
(Continued)

(56) References Cited

U.S. PATENT DOCUMENTS 5,463,262 A * 10/1995 Uchida ................ H02K 1/2773
310/156.55
8,766,505 B2 * 7/2014 Saito ...................... H02K 1/276
310/156.56
(Continued)

FOREIGN PATENT DOCUMENTS

JP    2007-174839 A    7/2007
JP    2012-244783 A    12/2012
(Continued)

OTHER PUBLICATIONS

International Search Report of the International Searching Authority dated Nov. 15, 2016 for the corresponding International application No. PCT/JP2016/074366 (and English translation).
(Continued)

*Primary Examiner* — Thanh Lam
(74) *Attorney, Agent, or Firm* — Posz Law Group, PLC

(57) ABSTRACT

A consequent-pole-type rotor including a rotor core and a permanent magnet 1 disposed inside the rotor core, includes a first rotor core having a first region into which the permanent magnet is inserted and a second rotor core that has a second region communicating with the first region and is stacked on the first rotor core, wherein a second width is larger than a first width, where the first width is a width of the first region in a radial direction of the rotor core and the second width is a width of the second region in the radial direction of the rotor core.

6 Claims, 18 Drawing Sheets

(58) Field of Classification Search
USPC .......................... 310/156.01, 156.53, 156.56
See application file for complete search history.

(56) References Cited

U.S. PATENT DOCUMENTS

| | | | | |
|---|---|---|---|---|
| 8,786,154 B2* | 7/2014 | Kim | .......................... | H02K 1/28 310/156.09 |
| 9,041,261 B2* | 5/2015 | Yamamoto | ........... | H02K 1/2766 310/156.53 |
| 2004/0217666 A1* | 11/2004 | Mellor | ................... | H02K 1/276 310/156.53 |
| 2012/0091846 A1* | 4/2012 | Nagai | ................... | H02K 1/2766 310/156.01 |

FOREIGN PATENT DOCUMENTS

| | | | |
|---|---|---|---|
| JP | 2013-132138 A | 7/2013 |
| JP | 2013-179775 A | 9/2013 |
| JP | 2015-204734 A | 11/2015 |

OTHER PUBLICATIONS

Office Action dated Mar. 25, 2020 for the corresponding Chinese application No. 201680088436.8(and English translation).
Office Action dated May 7, 2020 for the corresponding Japanese application No. 2018-535934(and English translation).

\* cited by examiner

CONSEQUENT-POLE-TYPE ROTOR, ELECTRIC MOTOR, AND AIR CONDITIONER

CROSS REFERENCE TO RELATED APPLICATION

This application is a U.S. national stage application of International Patent Application No. PCT/JP2016/074366 filed on Aug. 22, 2016, the disclosure of which is incorporated herein by reference.

TECHNICAL FIELD

The present invention relates to a consequent-pole-type rotor, an electric motor, and an air conditioner.

BACKGROUND

Conventionally, rare-earth magnets having high energy densities such as neodymium sintered magnets have generally been used for permanent magnets of electric motors mounted in compressors of air conditioners in order to improve energy-saving performance of the air conditioners. Electric motors using neodymium sintered magnets have been developed for fans of air conditioners.

Such permanent magnets are expensive because the permanent magnets contain precious rare-earth elements. Therefore, there is a strong demand for cost reduction by reducing the usage amount and processing cost of permanent magnets.

In general, permanent magnets are made by cutting a block into a specified shape. Therefore, as the number of permanent magnets used in an electric motor increases, the processing cost increases.

As a method of reducing the number of permanent magnets used in an electric motor, there is a method of forming a rotor with so-called consequent poles. In a consequent-pole-type rotor, magnet magnetic poles produced by permanent magnets and salient poles not produced by permanent magnets but formed in a core material are alternately arrayed in the circumferential direction. Therefore, the number of the magnet magnetic poles and the number of the salient poles are each half the number of the poles. In addition, the magnet magnetic poles whose number is half the number of the poles have the same polarity, and the salient poles whose number is half the number of the poles have a polarity different from a polarity of the magnet magnetic poles. Thus, in the consequent-pole-type rotor, the number of the permanent magnets is half the usual number. However, in the consequent-pole-type rotor, the inductance differs between the magnet magnetic poles and the salient poles, and there is a problem that vibration and noise become large due to the inductance imbalance.

To this problem, Patent Literature 1 contrives a shape of flux barriers at both ends of each permanent magnet in the consequent-pole-type rotor, thereby to improve inductance asymmetry to reduce vibration and noise.

PATENT LITERATURE

Patent Literature 1: Japanese Patent Application Laid-open No. 2012-244783

Technical Problem

However, in the conventional consequent-pole-type rotor disclosed in Patent Literature 1, the length of the permanent magnet is shorter as compared with the axial length of the rotor core. Therefore, there is a problem that leakage flux is generated from an axial end portion of the rotor core, and leakage flux toward a shaft of a magnetic material is also generated, so that induced voltage is lowered and output of an electric motor is also lowered.

SUMMARY

The present invention has been made in view of the above, and an object of the present invention is to obtain a consequent-pole-type rotor that can suppress lowering of induced voltage and lowering of output of an electric motor.

In order to solve the above-described problems and achieve the object, a consequent-pole-type rotor of the present invention includes a rotor core and a permanent magnet disposed inside the rotor core. The rotor core includes a first rotor core having a first region into which the permanent magnet is inserted, and a second rotor core having a second region communicating with the first region. The second rotor core is stacked on the first rotor core. A second width is larger than a first width, where the first width is a width of the first region in a radial direction of the rotor core and the second width is a width of the second region in the radial direction.

The consequent-pole-type rotor according to the present invention has an effect that it is possible to suppress lowering of induced voltage and lowering of output of an electric motor.

DETAILED DESCRIPTION

Hereinafter, a consequent-pole-type rotor, an electric motor, and an air conditioner according to embodiments of the present invention will be described in detail with reference to the drawings. Note that the invention is not limited to the embodiments.

First Embodiment

Figure 1:
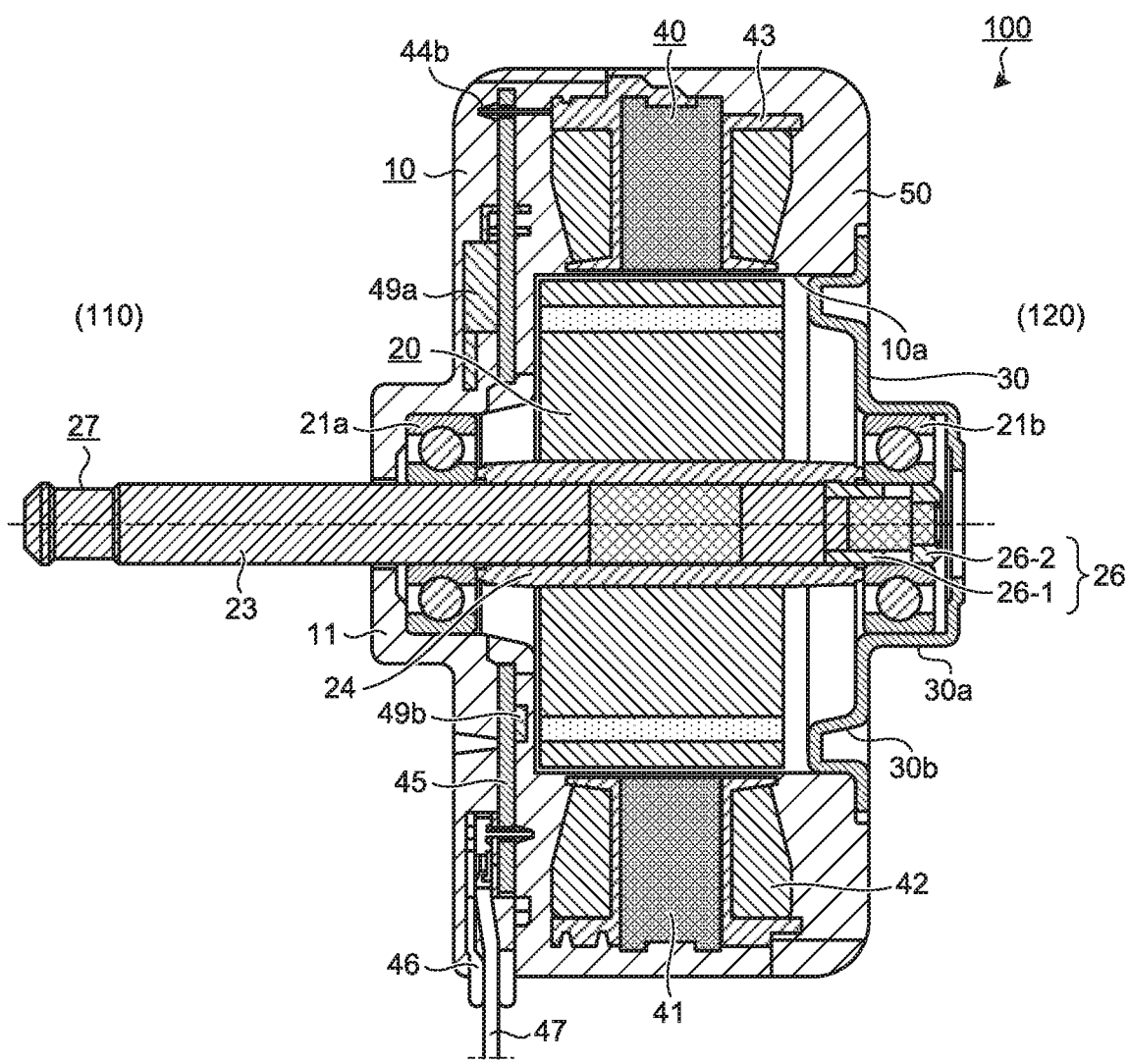
FIG. 1 is a cross-sectional view of an electric motor including a consequent-pole-type rotor according to a first embodiment of the present invention.

FIG. 1 is a cross-sectional view of an electric motor including a consequent-pole-type rotor according to a first embodiment of the present invention. An electric motor 100 illustrated in FIG. 1 includes a molded stator 10, a rotor 20, and a metal bracket 30 attached to one axial end portion of the molded stator 10. "Axial direction" is equal to a stacking direction of a plurality of rotor cores constituting the rotor 20. The electric motor 100 is a brushless DC motor that includes permanent magnets in the rotor 20 and is driven by an inverter. The rotor 20 is of an internal magnet type and is of a consequent-pole type.

The molded stator 10 includes a stator 40 and a mold resin 50 covering the stator 40. The axial direction of the molded stator 10 coincides with the axial direction of a shaft 23 extending through the rotor 20. FIG. 1 illustrates, as components of the stator 40, a stator core 41, a coil 42 wound around the stator core 41, an insulating portion 43 provided at the stator core 41, and a neutral terminal 44b provided at the insulating portion 43. FIG. 1 also illustrates, as components of the stator 40, a substrate 45 attached to the insulating portion 43, a lead exit part 46 assembled to the substrate 45, a lead 47 exiting from the lead exit part 46, an Integrated Circuit (IC) 49a mounted on the substrate 45, and a hall IC 49b mounted on a surface of the substrate 45 on the rotor 20 side.

The rotor 20 includes a shaft assembly 27, a resin portion 24 that integrates the rotor 20 body and the shaft assembly 27, a load-side rolling bearing 21a that is mounted on the shaft 23 and supported by a bearing support 11 of the molded stator 10, and an opposite-to-load-side rolling bearing 21b that is mounted on the shaft 23 and supported by the bracket 30. A load side 110 represents the side of an end face of both end faces of the electric motor 100, from which the shaft 23 projects, and an opposite-to-load side 120 represents the side of an end face at which the bracket 30 is provided.

The shaft assembly 27 includes an insulating sleeve 26 consisting of a pair of insulating sleeves 26-1 and 26-2. The insulating sleeve 26 is disposed between the opposite-to-load-side rolling bearing 21b and the shaft 23.

Figure 2:
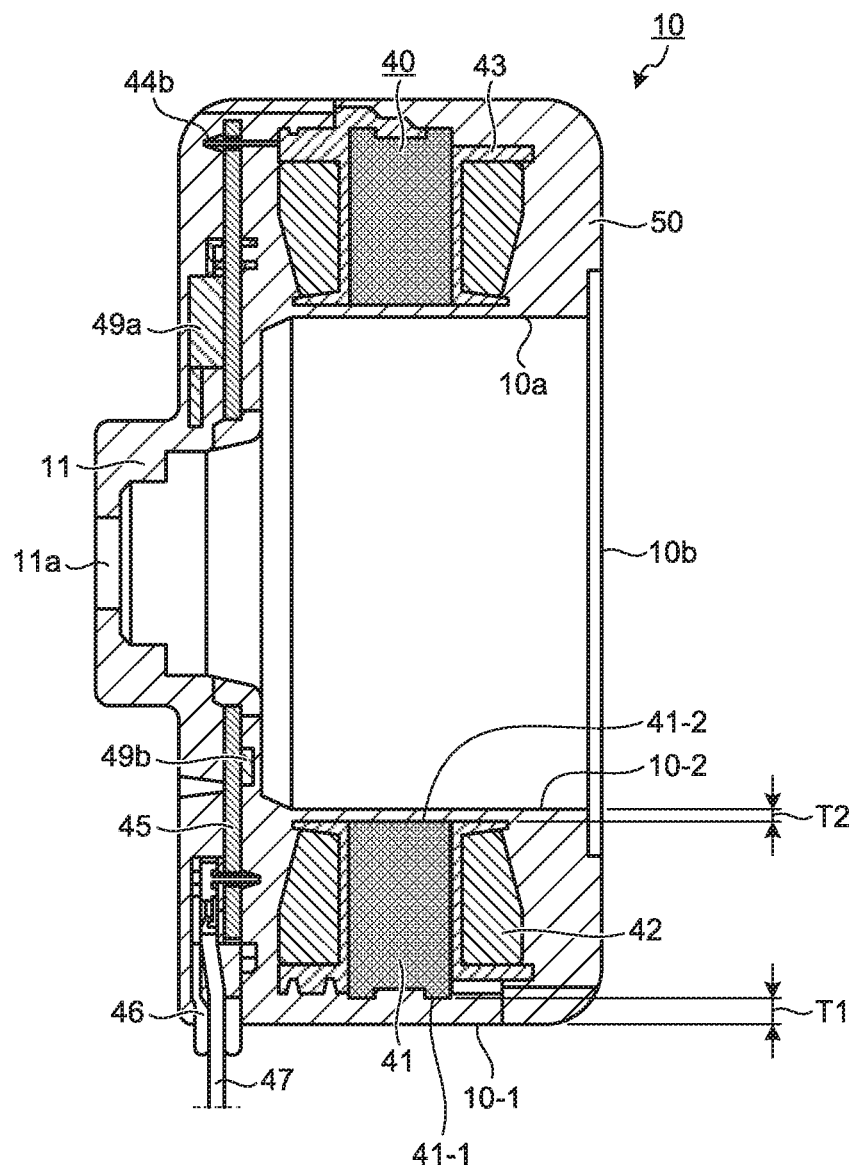
FIG. 2 is a cross-sectional view of a molded stator illustrated in FIG. 1.

FIG. 2 is a cross-sectional view of the molded stator illustrated in FIG. 1. In FIG. 2, the same reference numerals are assigned to the same components as those in FIG. 1. The molded stator 10 has an opening 10b formed in one axial end portion of the molded stator 10. The rotor 20 is inserted into the opening 10b. In an axial end portion of the molded stator 10 in which the load-side rolling bearing 21a of the rotor 20 inserted into the opening 10b is fitted, a hole 11a larger than the diameter of the shaft assembly 27 of the rotor 20 illustrated in FIG. 1 is formed.

Figure 3:
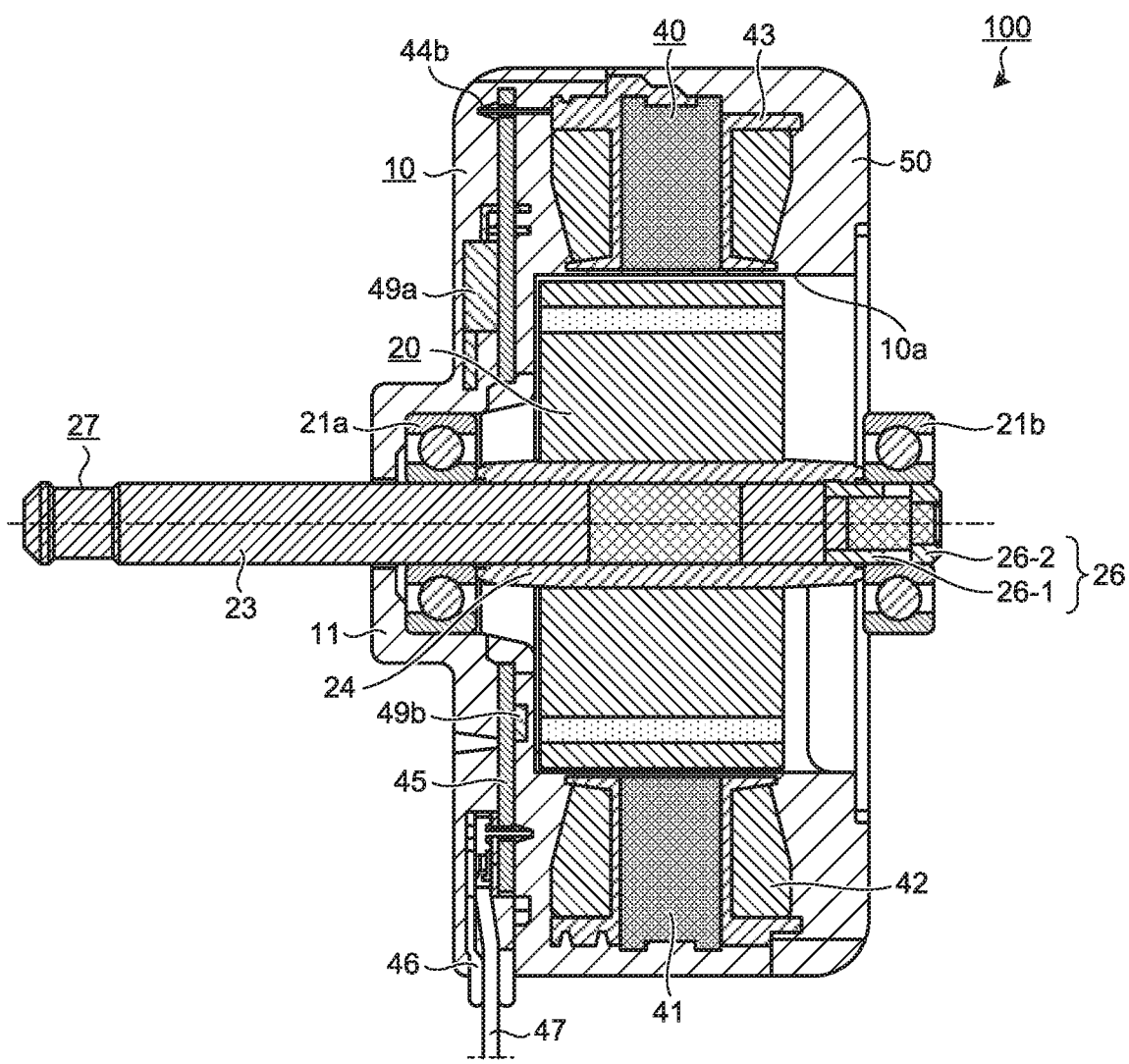
FIG. 3 is a cross-sectional view illustrating a state in which a rotor is inserted in a molded stator illustrated in FIG. 2.

FIG. 3 is a side cross-sectional view illustrating a state in which the rotor is inserted in the molded stator illustrated in FIG. 2. In FIG. 3, the same reference numerals are assigned to the same components as those in FIG. 1. The rotor 20 inserted through the opening 10b of the molded stator 10 illustrated in FIG. 2 is disposed such that the load side of the shaft assembly 27 is drawn out to the outside of the molded stator 10 through the hole 11a illustrated in FIG. 2. At this time, the load-side rolling bearing 21a mounted on the shaft 23 is pressed until the load-side rolling bearing 21a abuts on the bearing support 11 illustrated in FIG. 1, and is supported by the bearing support 11. The bearing support 11 is an axial end portion of the molded stator 10, and is provided opposite to the opening 10b.

On the opposite-to-load side of the shaft assembly 27, the opposite-to-load-side rolling bearing 21b is mounted. The mounting of the opposite-to-load-side rolling bearing 21b is generally by press fitting. The insulating sleeve 26 integrally molded with and formed on the shaft 23 is provided between the opposite-to-load-side rolling bearing 21b and the opposite-to-load side of the shaft 23, which will be described in detail later.

The bracket 30 illustrated in FIG. 1 closes the opening 10b of the molded stator 10 illustrated in FIG. 2 and supports the opposite-to-load-side rolling bearing 21b illustrated in FIG. 3, and is press-fitted into the molded stator 10. The bracket 30 includes a bearing support 30a and a press-fitted portion 30b integrally formed with the bearing support 30a. The bearing support 30a supports the opposite-to-load-side rolling bearing 21b. The press-fitted portion 30b has a ring shape.

The attachment of the bracket 30 to the molded stator 10 is performed by press-fitting the press-fitted portion 30b into the opening 10b side of an inner peripheral portion 10a of the molded stator 10. The outer diameter of the press-fitted portion 30b is larger than the inner diameter of the inner peripheral portion 10a of the molded stator 10 by a margin for press fitting. The material of the bracket 30 can be exemplified by a galvanized steel sheet, an aluminum alloy, an austenitic stainless alloy, a copper alloy, cast iron, steel, or an iron alloy.

The configuration of the molded stator 10 will be described below. The molded stator 10 illustrated in FIG. 2 includes the stator 40 and the mold resin 50 for molding. An unsaturated polyester resin is used for the mold resin 50. Bulk Molding Compound (BMC) with various additives added to an unsaturated polyester resin is particularly desirable for an electric motor. Thermoplastic resins such as PolyButylene Terephthalate (PBT) and Poly Phenylene Sulfide (PPS) have a better side because runners during molding can be recycled.

However, unsaturated polyester resins and BMC excel in providing dimensional accuracy because the unsaturated polyester resins and BMC have linear expansion coefficients close to linear expansion coefficients of iron-based materials such as the stator core 41, the load-side rolling bearing 21*a*, and the opposite-to-load-side rolling bearing 21*b*, and have heat shrinkage percentages of 1/10 or less of heat shrinkage percentages of thermoplastic resins.

In addition, as compared with the case where an outer shell of the electric motor 100 is formed of a metal such as iron or aluminum, an outer shell of the electric motor 100 formed of an unsaturated polyester resin and BMC has better heat dispersion characteristics. In addition, when an outer shell of the electric motor 100 is formed of a metal, the metal forming the outer shell of the electric motor 100 is separated from the coil 42 and the substrate 45 due to insulation problem. By contrast, the unsaturated polyester resin and BMC are insulators and thus present no insulation problem even when covering the coil 42 and the substrate 45, and have high thermal conductivities and thus have excellent heat dispersion characteristics, contributing to higher output power of the electric motor 100.

The load-side rolling bearing 21*a* is supported by the bearing support 11 formed of the mold resin 50, and the opposite-to-load-side rolling bearing 21*b* and the bracket 30 are supported by the inner peripheral portion 10*a* formed of the mold resin 50. Therefore, if the dimensional accuracy of the mold resin 50 is poor, the axis of the rotor 20 and the axis of the stator 40 are misaligned, causing vibration and noise. However, using the unsaturated polyester resin and BMC having small heat shrinkage percentages facilitates the provision of dimensional accuracy after molding.

In addition, using a resin having a large linear expansion coefficient may cause a problem that the bearings rattle when the temperature of the electric motor 100 becomes high. The unsaturated polyester resin and BMC, whose linear expansion coefficients are close to the linear expansion coefficients of iron-based materials such as the stator core 41, the load-side rolling bearing 21*a*, and the opposite-to-load-side rolling bearing 21*b*, thus can prevent misalignment between the axis of the rotor 20 and the axis of the stator 40, irrespective of the temperature of the electric motor 100.

Further, the unsaturated polyester resin and BMC constrain the stator 40 when cured, and thus can prevent deformation of the stator 40 due to the exciting force of the electric motor 100, and can suppress vibration and noise.

Figure 4:
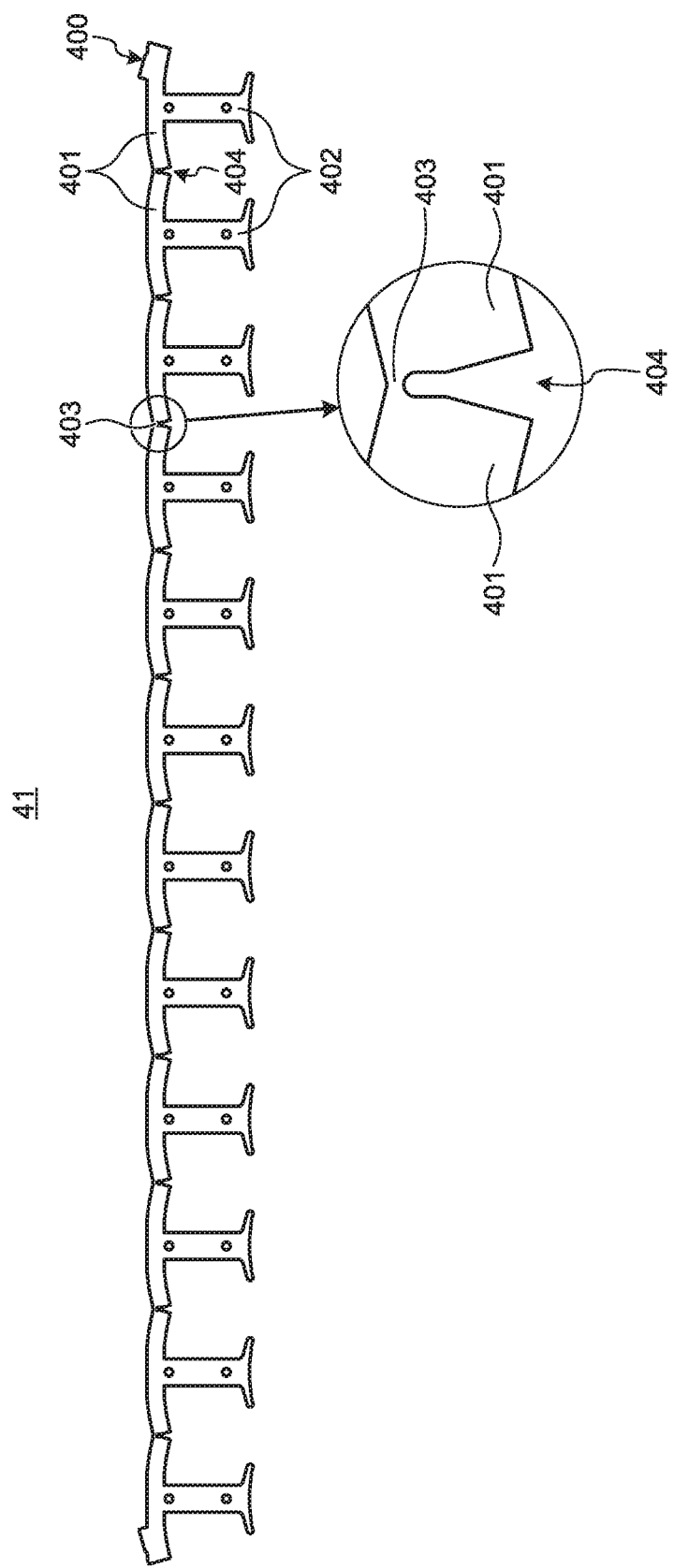
FIG. 4 is a configuration diagram of a stator core composed of a plurality of core segments and developed in a strip.

FIG. 4 is a configuration diagram of the stator core composed of a plurality of core segments and developed in a strip. The stator core 41 illustrated in FIG. 4 has a plurality of core segments 400 arrayed such that each of the plurality of core segments 400 is in contact with another adjacent one of the plurality of core segments 400. Each of the plurality of core segments 400 has a back yoke 401 and a tooth 402 projecting from the back yoke 401. A thin-walled portion 403 connecting adjacent back yokes 401 is provided between the back yokes 401.

Figure 5:
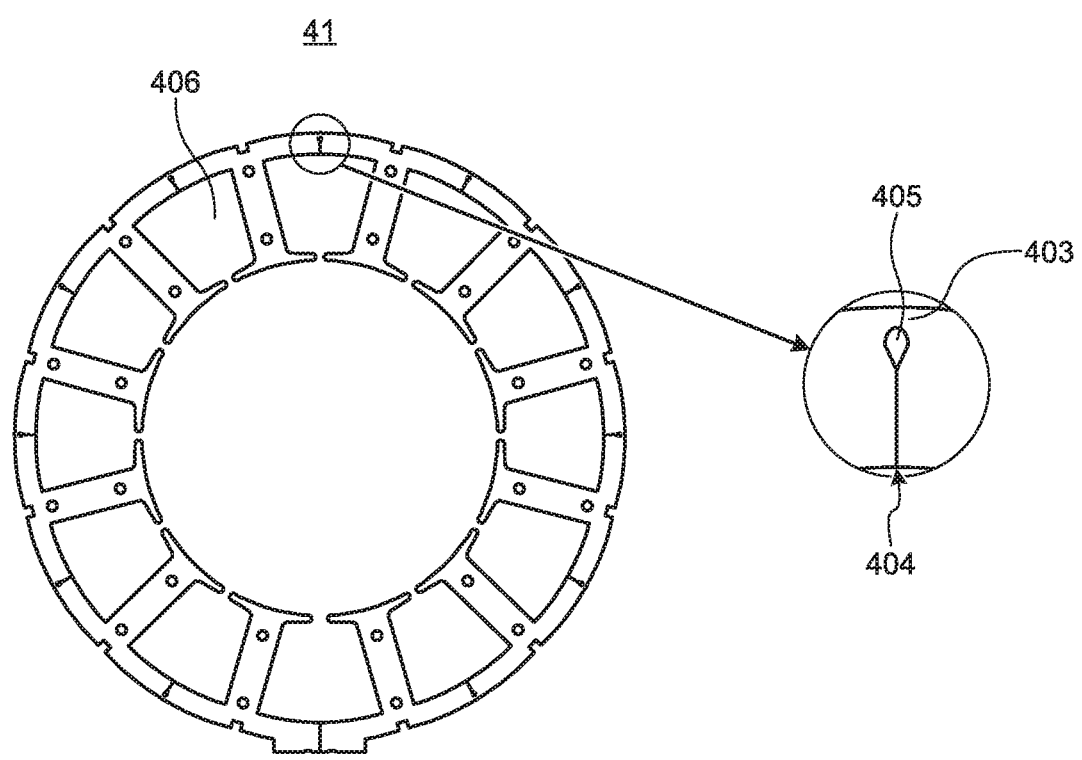
FIG. 5 is a diagram illustrating a state in which the developed stator core illustrated in FIG. 4 is bent into an annular shape.

FIG. 5 is a diagram illustrating a state in which the developed stator core illustrated in FIG. 4 is bent into an annular shape. The annular stator core 41 illustrated in FIG. 5 is formed by providing the coil 42 in FIG. 1 to each of the plurality of teeth 402 illustrated in FIG. 4, and then bending a core segment 400 group in a strip at the thin-walled portions 403 into an annular shape.

As illustrated in FIGS. 4 and 5, the stator core 41 composed of the plurality of core segments 400 allows the coil 42 to be wound thereon in a state of being developed in a strip, and thus enables densification of the coil 42 and is effective for increased efficiency. However, since the core segments 400 are connected by the thin-walled portions 403, the stator core 41 has a weak rigidity when formed in an annular shape. For those having large exciting force like the consequent-pole-type electric motor 100, it is effective to mold the stator core 41 with an unsaturated polyester resin, that is, cover the stator core 41 with an unsaturated polyester resin.

Other than the structure in which the adjacent back yokes 401 are connected to each other by the thin-walled portions 403 as in FIG. 4, the stator core 41 composed of the plurality of core segments 400 may be of a structure in which dowels in recessed and projecting shapes are formed at end portions of each back yoke 401, and the dowels are connected to each other, or may be of a structure in which the back yokes 401 separated from each other are fixed by welding or fitting together. By covering the stator core 41 thus configured with an unsaturated polyester resin, vibration and noise can be reduced.

It is desirable to completely cover the stator core 41 with an unsaturated polyester resin in this manner. As illustrated in FIG. 2, it is desirable that the molded stator 10 is configured to satisfy a relationship of T1>T2 where T1 is the thickness from an outer peripheral portion 41-1 of the stator core 41 to an outer peripheral portion 10-1 of the unsaturated polyester resin, and T2 is the thickness from an inner peripheral portion 41-2 of the stator core 41 to an inner peripheral portion 10-2 of the unsaturated polyester resin.

If the thickness T2 is made too large, the diameter of the rotor 20 must be reduced, and the magnetic gap between the stator core 41 and the rotor 20 becomes large, deteriorating electric motor characteristics. Therefore, in the molded stator 10 according to the first embodiment, by making the thickness T1 larger than the thickness T2, the rigidity of the thickness T1 on an outer side in the radial direction is increased. The term "radial direction" indicates the radial direction of the rotor 20.

If the axis of the rotor 20 and the axis of the stator 40 are misaligned, causing imbalance in the gap between the stator core 41 and the rotor 20, an exciting force due to eccentricity is added. Therefore, eccentricity should be minimized as much as possible in assemblage. As the thickness T2 increases, a corresponding imbalance tends to occur in the gap. Thus, it is effective to set the thickness T2 to zero. However, in that case, spaces between the adjacent teeth 402 of the stator core 41 are filled with the unsaturated polyester resin up to the teeth tips. Exciting force includes a force shaking the teeth tips to the left and right. Thus, completely filling the spaces between the teeth 402 leads to the reduction of the influence of this force.

For the stator core 41 illustrated in FIGS. 4 and 5, by providing the unsaturated polyester resin to split surfaces 404 between the adjacent core segments 400, the influence of exciting force acting on the teeth 402 can be reduced.

Therefore, in the stator core 41, holes 405 are formed in the split surfaces 404 of the annular stator core 41 illustrated in FIG. 5. Each hole 405 is formed by providing a groove or a notch between the adjacent back yokes 401. When unsaturated polyester is molded on the annular stator core 41, the holes 405 are filled with unsaturated polyester resin. The holes 405 need not be filled with unsaturated polyester in the entire area from one axial end face to the other axial end face of the stator core 41, and only need to be filled slightly from one axial end face of the stator core 41. In this case also, an effect of attenuating vibration can be expected. As the holes 405 are made larger in order to increase the filling amount, magnetic characteristic of the holes 405 is degraded. Therefore, the filling amount is determined appropriately. The holes 405 in the split surfaces 404 may have a groove shape open to the outer peripheral surface of the stator core 41, or a groove shape open to the slot 40b side, to provide the same effect.

Next, the configuration of the rotor 20 illustrated in FIG. 1 will be described.

Figure 6:
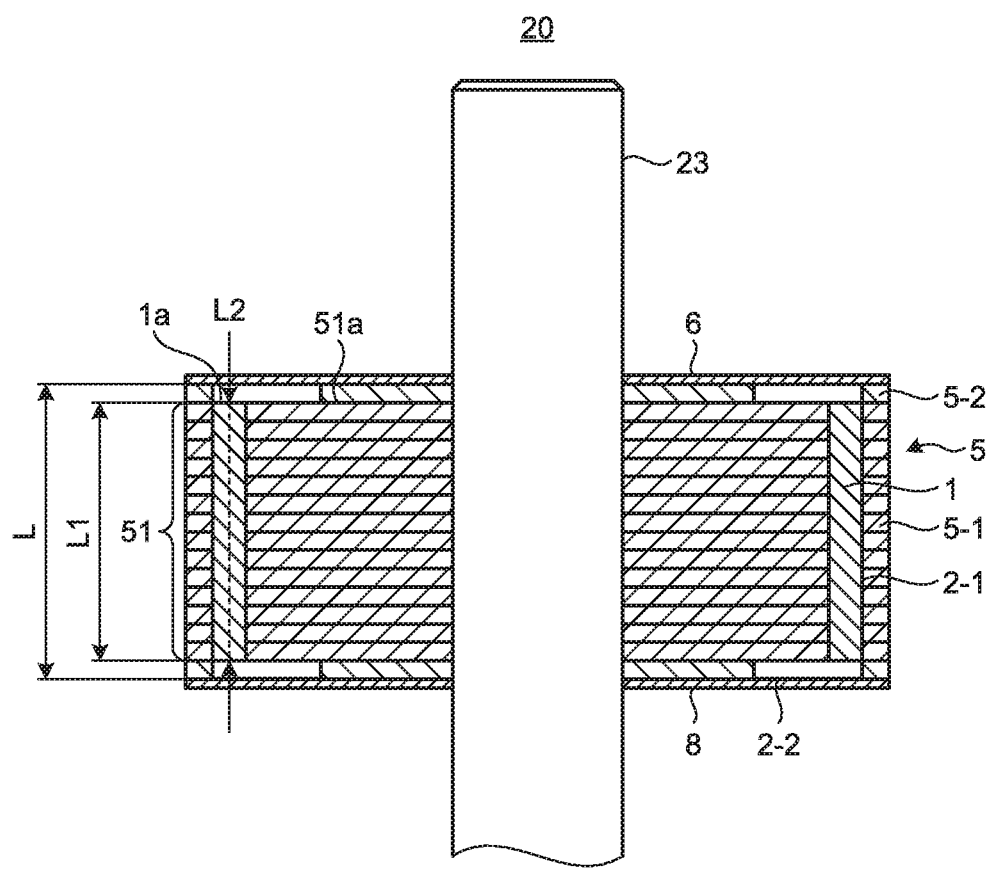
FIG. 6 is a cross-sectional view of the rotor illustrated in FIG. 1.

FIG. 6 is a cross-sectional view of the rotor illustrated in FIG. 1. The rotor 20 illustrated in FIG. 6 includes an annular rotor core 5, the shaft 23 extending through the rotor core 5, a plurality of permanent magnets 1 disposed inside the rotor core 5, and two end plates 8 arranged on both end surfaces of the rotor core 5 in the axial direction. The rotor core 5 includes a rotor core block 51 in which a plurality of first rotor cores 5-1 are stacked in the axial direction and two second rotor cores 5-2 arranged on axial both ends of the rotor core block 51. Each first rotor core 5-1 has a first magnet insertion hole 2-1 into which the permanent magnet 1 is inserted, and each second rotor core 5-2 has a second magnet insertion hole 2-2 into which the permanent magnet 1 is inserted.

Each of the first rotor core 5-1 and the second rotor core 5-2 is made of a core material that is a soft magnetic material, and is specifically configured by stacking a plurality of electromagnetic steel sheets. The thickness of the electromagnetic steel sheet is generally from 0.1 mm to 0.7 mm. The permanent magnets 1 have a flat shape with a rectangular cross section. An example of the thickness of the permanent magnet 1 is 2 mm. The permanent magnets 1 are rare earth magnets, and are neodymium sintered magnets whose main component is neodymium (Nd)-iron (Fe)-boron (B).

Since the rotor 20 is an internal-magnet type, it includes the end plates 8 to prevent the permanent magnet 1 from falling off in the axial direction. However, when an axial length L2 of the permanent magnet 1 is longer than an axial length L of a rotor core group in which the second rotor core 5-2 is stacked on the rotor core block 51, it is likely that the end plate 8 comes into contact with the permanent magnet 1 when being attached, causing the permanent magnet 1 to be broken.

Therefore, the rotor 20 is configured in such a manner that the axial length L2 of the permanent magnet 1 is shorter than the axial length L of the rotor core group, considering a dimensional tolerance. In the rotor 20 illustrated in FIG. 6, the axial length L2 of the permanent magnet 1 is equal to an axial length L1 of the rotor core block 51. Further, an axial end surface 1a of the permanent magnet 1 in the axial direction coincides with an axial end surface 51a of the rotor core block 51 in the axial direction, that is, an axial end surface of the first rotor core 5-1. The reason why the rotor 20 has such a configuration will be described later.

Figure 7:
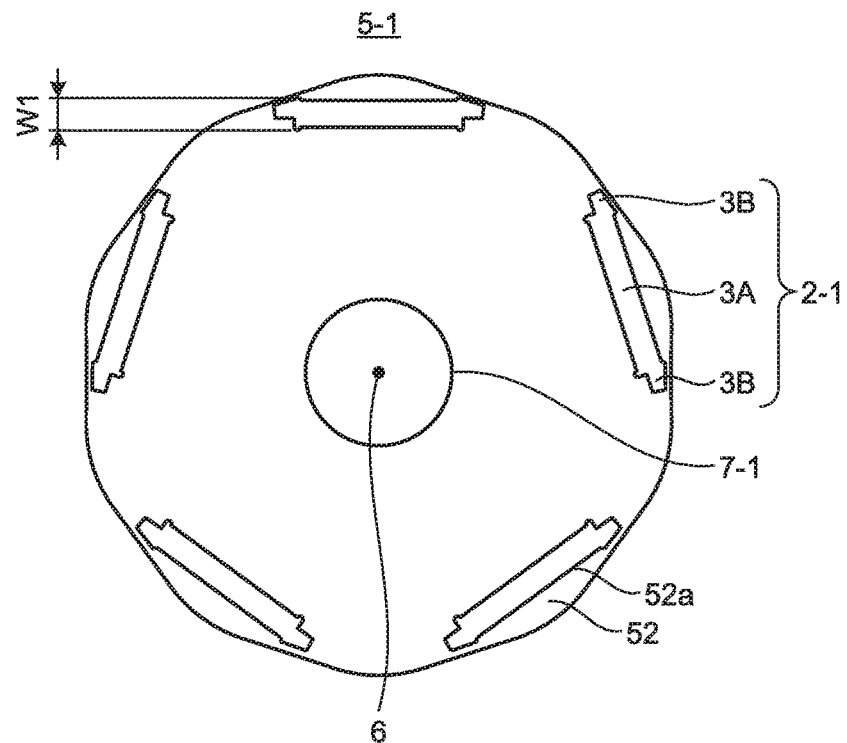
FIG. 7 is a front view of a first rotor core illustrated in FIG. 6.

FIG. 7 is a front view of the first rotor core illustrated in FIG. 6. In FIG. 7, illustration of the permanent magnets 1 illustrated in FIG. 6 is omitted. The first rotor core 5-1 has a shaft insertion hole 7-1 at the center. Also, the first rotor core 5-1 has five first magnet insertion holes 2-1 arrayed in the circumferential direction. The term "circumferential direction" indicates the circumferential direction of the rotor 20 illustrated in FIG. 6. The number of the first magnet insertion holes 2-1 is half the number of poles of the rotor 20. The five first magnet insertion holes 2-1 are arrayed at equal intervals in the circumferential direction, and are disposed equidistantly from a rotation axis 6.

Each first magnet insertion hole 2-1 is composed of a rectangular first region 3A into which the permanent magnet 1 is inserted and two regions 3B into which the permanent magnet 1 is not inserted.

The regions 3B are formed at longitudinal both ends of the first region 3A, one at a place. The regions 3B have the function of flux barriers for suppressing leakage flux against the permanent magnet 1 inserted in the first region 3A, and have the function of making magnetic flux density distribution over the outer peripheral surface of the first rotor core 5-1 close to a sinusoidal wave to short-circuit magnetic flux of the permanent magnets 1 inserted in the adjacent first magnet insertion holes 2-1 via the first rotor core 5-1.

In FIG. 7, the width of the first region 3A in the radial direction of the first rotor core 5-1 is a first width W1. A first core portion 52 is a core portion between a radially outer portion of the permanent magnet 1 inserted in the first magnet insertion hole 2-1 and the outer circumferential surface of the first rotor core 5-1. In FIG. 7, a radially inner surface of the first core portion 52 is a radially outer side surface 52a.

Figure 8:
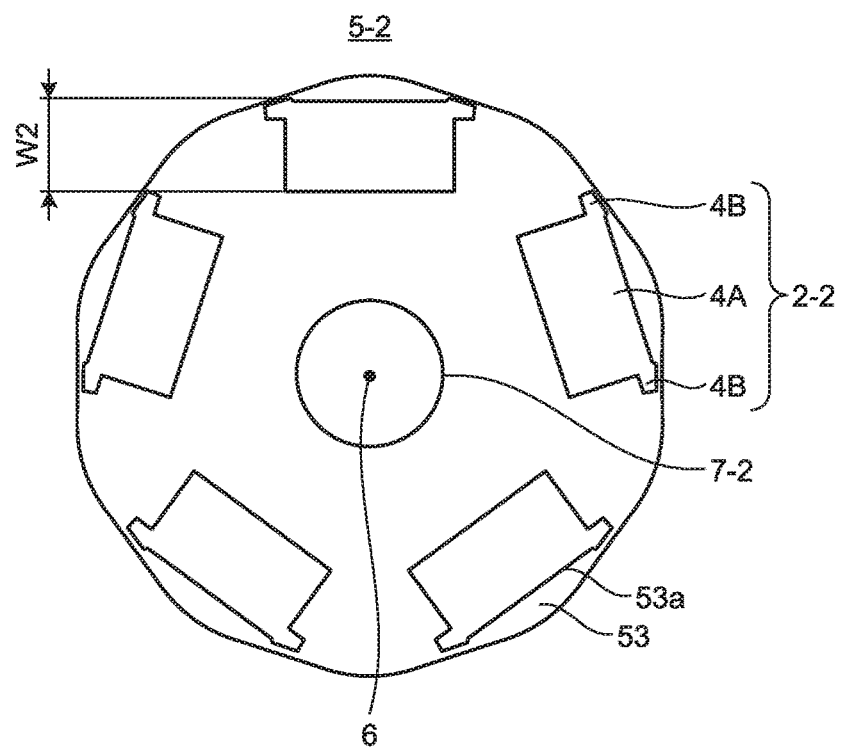
FIG. 8 is a front view of a second rotor core illustrated in FIG. 6.

FIG. 8 is a front view of the second rotor core illustrated in FIG. 6. In FIG. 8, illustration of the permanent magnets 1 illustrated in FIG. 6 is omitted. The second rotor core 5-2 has a shaft insertion hole 7-2 at the center. Also, the second rotor core 5-2 has five second magnet insertion holes 2-2 arrayed in the circumferential direction. The number of the second magnet insertion holes 2-2 is half the number of poles of the rotor 20. The five second magnet insertion holes 2-2 are arrayed at equal intervals in the circumferential direction, and are disposed equidistantly from the rotation axis 6.

Each second magnet insertion hole 2-2 of the second rotor core 5-2 is composed of a rectangular second region 4A and two regions 4B. The second region 4A communicates with the first region 3A illustrated in FIG. 7.

The regions 4B are formed at longitudinal both ends of the second region 4A, one at a place. The regions 4B have the function of flux barriers like the regions 3B illustrated in FIG. 7, when the permanent magnet 1 is inserted into the second region 4A.

The second region 4A has the function of a flux barrier for suppressing a short loop of magnetic flux generated in the rotor core 5. Details of the short loop will be described later.

In FIG. 8, the width of the second region 4A in the radial direction of the second rotor core 5-2 is a second width W2. A second core portion 53 is a core portion between the radially outer portion of the permanent magnet 1 inserted in the second magnet insertion hole 2-2 and the outer circumferential surface of the second rotor core 5-2. In FIG. 8, the radially inner surface of the second core portion 53 is a radially outer side surface 53a.

Figure 9:
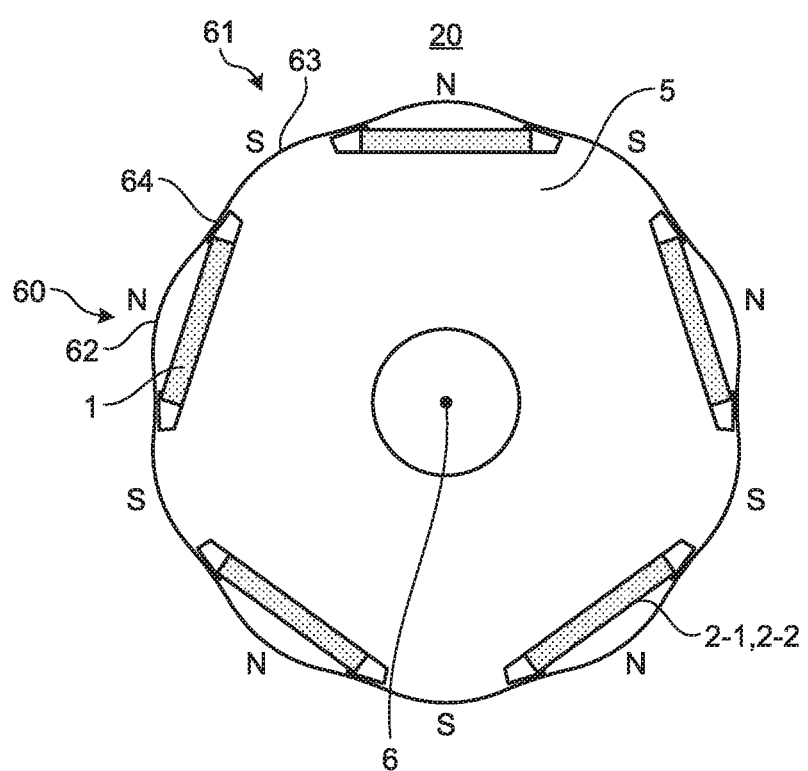
FIG. 9 is a front view of the rotor illustrated in FIG. 6.

FIG. 9 is a front view of the rotor illustrated in FIG. 6. The rotation axis 6 of the rotor 20 illustrated in FIG. 9 coincides with the axis of the rotor core 5. The five first magnet insertion holes 2-1 and the five second magnet insertion holes 2-2 extend through the rotor core 5 in the axial direction. The first magnet insertion holes 2-1 and the second magnet insertion holes 2-2 are formed to be close to the outer circumferential surface of the rotor core 5 and extend in the circumferential direction. Adjacent magnet insertion holes are spaced.

The rotor 20 has ten magnetic poles arrayed such that the polarities alternate at the outer peripheral surface of the rotor core 5 in the circumferential direction. Specifically, the rotor 20 has five first magnetic poles that are formed by the five permanent magnets 1, individually, and have the same polarity, and five second magnetic poles each of which is formed in the rotor core 5 between the permanent magnets 1 adjacent to each other and has a polarity different from a polarity of the first magnetic poles. In the illustrated example, the first magnetic poles are N poles and the second magnetic poles are S poles, but the poles may be reversed. The ten magnetic poles of the rotor 20 are arranged at equal angular intervals in the circumferential direction with a pole pitch of 360 degrees/10=36 degrees.

In this manner, in the consequent-pole-type rotor 20, the five permanent magnets 1, which are half the number of the poles, provide the five first magnetic poles, individually. Further, the five second magnetic poles, which are half the number of the poles, are each formed in the core material of the rotor core 5 between the permanent magnets 1 adjacent to each other. The second magnetic poles are so-called salient poles, and are formed by magnetizing the rotor 20.

Therefore, in the rotor 20, first magnetic pole portions 60 that include the permanent magnets 1 and have the first magnetic poles by the permanent magnets 1, and second magnetic pole portions 61 that are core magnetic pole portions not including the permanent magnets 1 and have the second magnetic poles that are fictitious poles are arrayed alternately in the circumferential direction of the rotor 20. In the consequent-pole-type rotor 20, the number of poles is an even number of four or more.

The outer shape of the rotor core 5 is a so-called flower circle shape. The flower circle shape is a shape in which the outer diameter of the rotor core 5 is the maximum at pole centers 62 and 63 and is the minimum at inter-pole spaces 64, and is a shape forming arcs from the pole centers 62 and 63 to the inter-pole spaces 64. The pole centers 62 are pole centers of the first magnetic poles, and the pole centers 63 are pole centers of the second magnetic poles. In the illustrated example, the flower circle shape is a shape in which ten petals of the same shape and the same size are arranged at an equal angle. Therefore, the outer diameter of the rotor core 5 at the pole centers 62 is equal to the outer diameter of the rotor core 5 at the pole centers 63. The circumferential width of each magnet insertion hole 2 is larger than the pole pitch.

Figure 10:
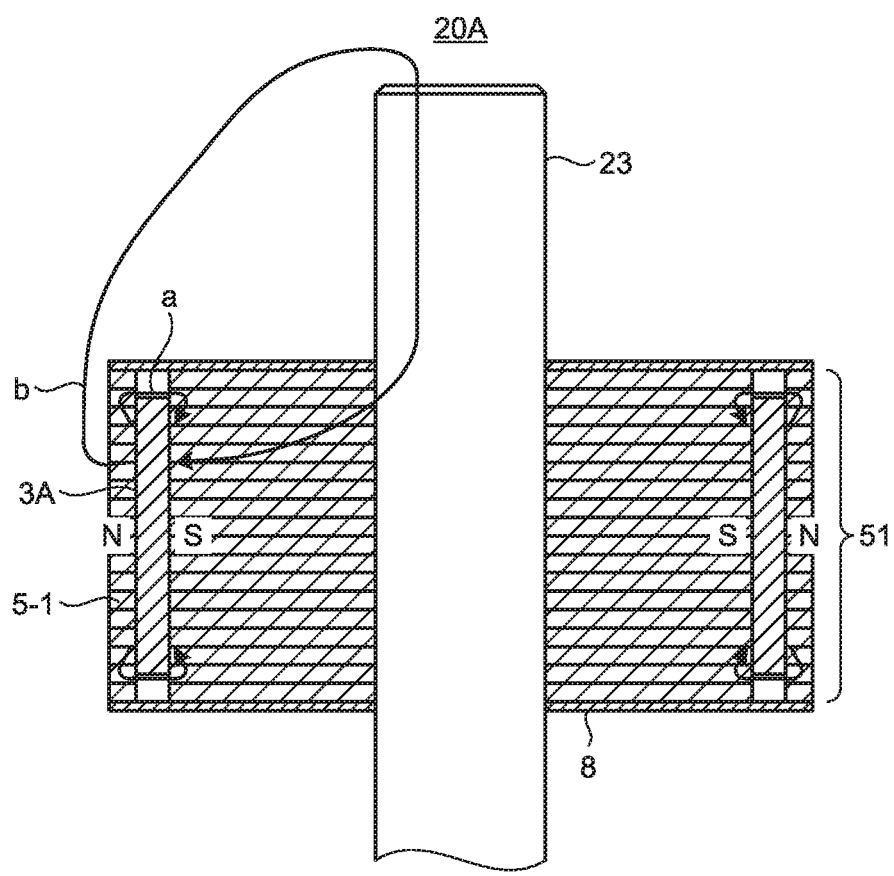
FIG. 10 is a cross-sectional view of a consequent-pole-type rotor according to a comparative example.

FIG. 10 is a cross-sectional view of a consequent-pole-type rotor according to a comparative example. A difference between a rotor 20A illustrated in FIG. 10 and the rotor 20 illustrated in FIG. 6 is in that the rotor 20A includes the rotor core block 51 and the two end plates disposed at axial both ends of the rotor core block 51 but does not include the second rotor core 5-2 illustrated in FIG. 6.

In the rotor 20A, a portion of magnetic flux generated from the radially outer N-pole of the permanent magnet 1 inserted in the first region 3A provided in the first rotor core 5-1 flows to the first rotor core 5-1 radially outside the permanent magnet 1, and then flows in the axial direction. Further, this magnetic flux passes through a radially inner core portion of the permanent magnet 1 via the first region 3A, and enters the S-pole of the permanent magnet 1 again. In FIG. 10, the locus of the leakage flux flowing in this manner is represented as a short loop a.

Since the shaft 23 is made of a magnetic material in the rotor 20A, magnetic flux leaking from the permanent magnet 1 flows through a stator core not illustrated, the shaft 23, the first rotor core 5-1, and the permanent magnet 1 in this order. In FIG. 10, the locus of the leakage flux flowing in this manner is represented as a long loop b.

In the consequent-pole-type rotor 20A, magnetic force generated in a virtual magnetic-pole portion corresponding to the second pole portion 61 illustrated in FIG. 9 is weaker than magnetic force generated in a magnet magnetic-pole portion corresponding to the first pole portion 60 illustrated in FIG. 9. Therefore, the leakage flux of the short loop a can be easily generated.

Figure 11:
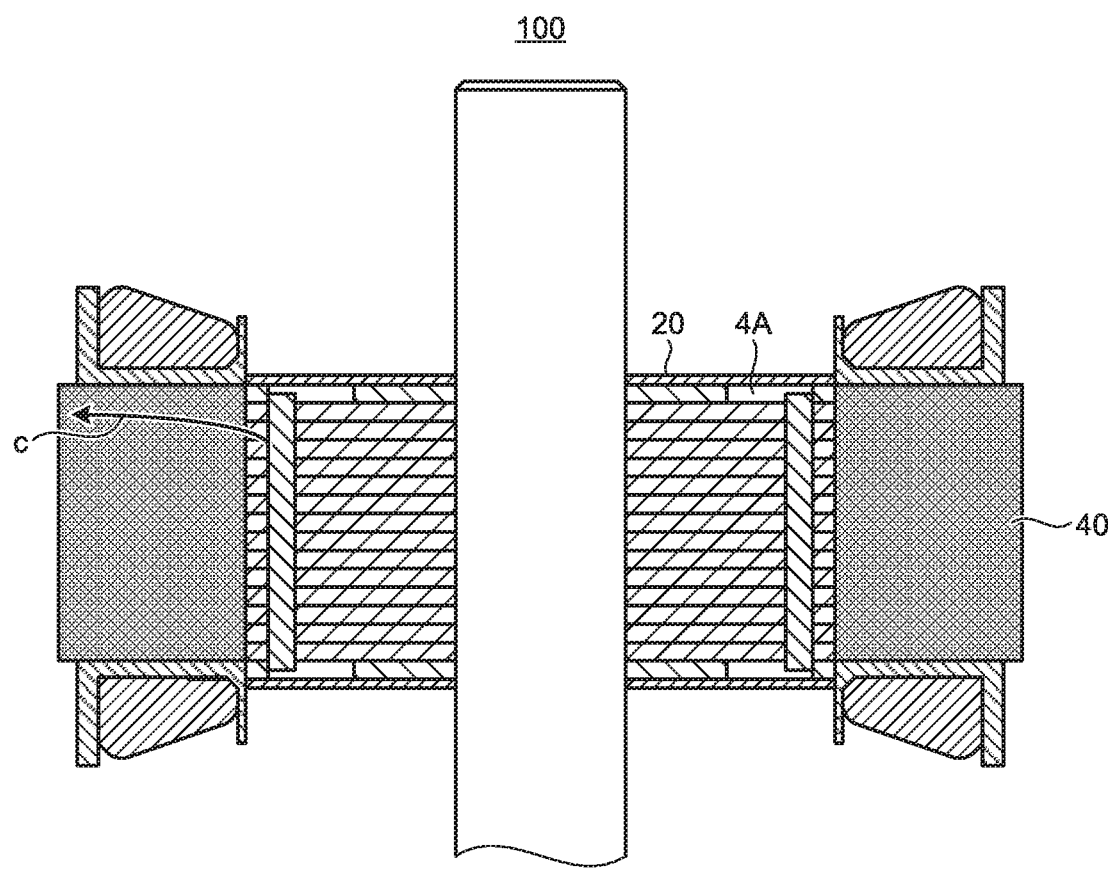
FIG. 11 is an explanatory diagram of a flow of magnetic flux generated in the electric motor according to the first embodiment of the present invention.

FIG. 11 is an explanatory diagram of a flow of magnetic flux generated in the electric motor according to the first embodiment of the present invention. In the electric motor 100 illustrated in FIG. 11, the rotor illustrated in FIG. 6 is incorporated into the stator 40. As described referring to FIG. 6, in the rotor 20, the second rotor cores 5-2 are arranged on axial both ends of the rotor core block 51. In each second rotor core 5-2, the second region 4A wider than the first region 3A illustrated in FIG. 10 is formed. For the magnetic flux leaking from the permanent magnet 1, magnetic resistance by the second region 4A has a higher value than magnetic resistance by the first region 3A. Therefore, in the electric motor 100 using the rotor 20, the leakage flux of the short loop a illustrated in FIG. 10 is suppressed, and magnetic flux c generated from the permanent magnet 1 can be used as magnetic flux entering the stator 40.

Figure 12:
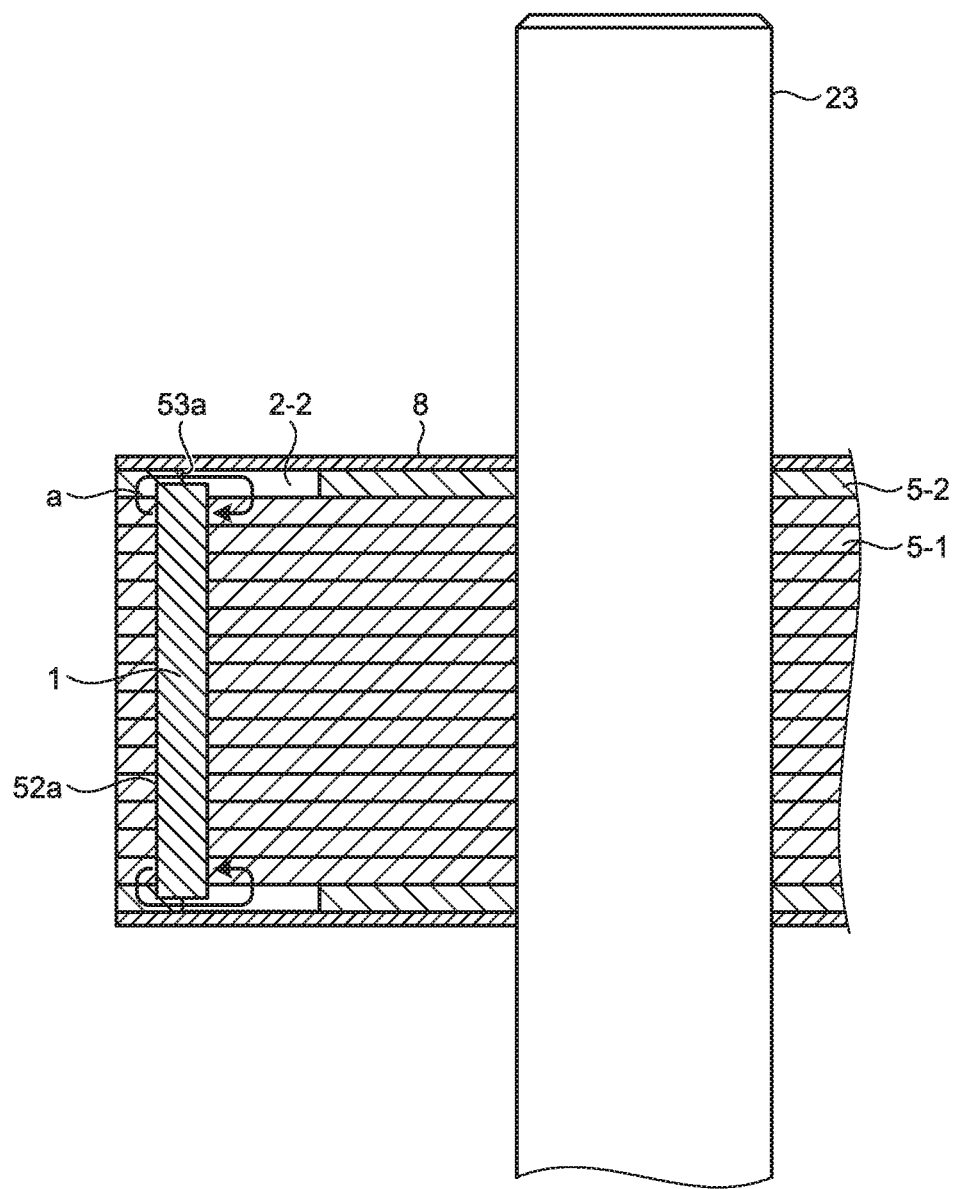
FIG. 12 is a diagram illustrating a first modification of the consequent-pole-type rotor according to the first embodiment of the present invention.

FIG. 12 is a diagram illustrating a first modification of the consequent-pole-type rotor according to the first embodiment of the present invention. A difference between the rotor 20 illustrated in FIG. 6 and a rotor 20-1 illustrated in FIG. 12 is the shape of the second rotor core 5-2. In the second rotor core 5-2 included in the rotor 20-1, the radially outer side surface 53a is closer to the shaft 23 than the radially outer side surface 52a. In the rotor 20-1 configured in this manner, the leakage flux of the short loop a is suppressed as compared with that in the rotor 20A illustrated in FIG. 10. Further, since the radially outer side surface 53a of the rotor 20-1 serves as a member for preventing the permanent magnet 1 from falling off, the end plate 8 can be made thinner or can be omitted.

Figure 13:
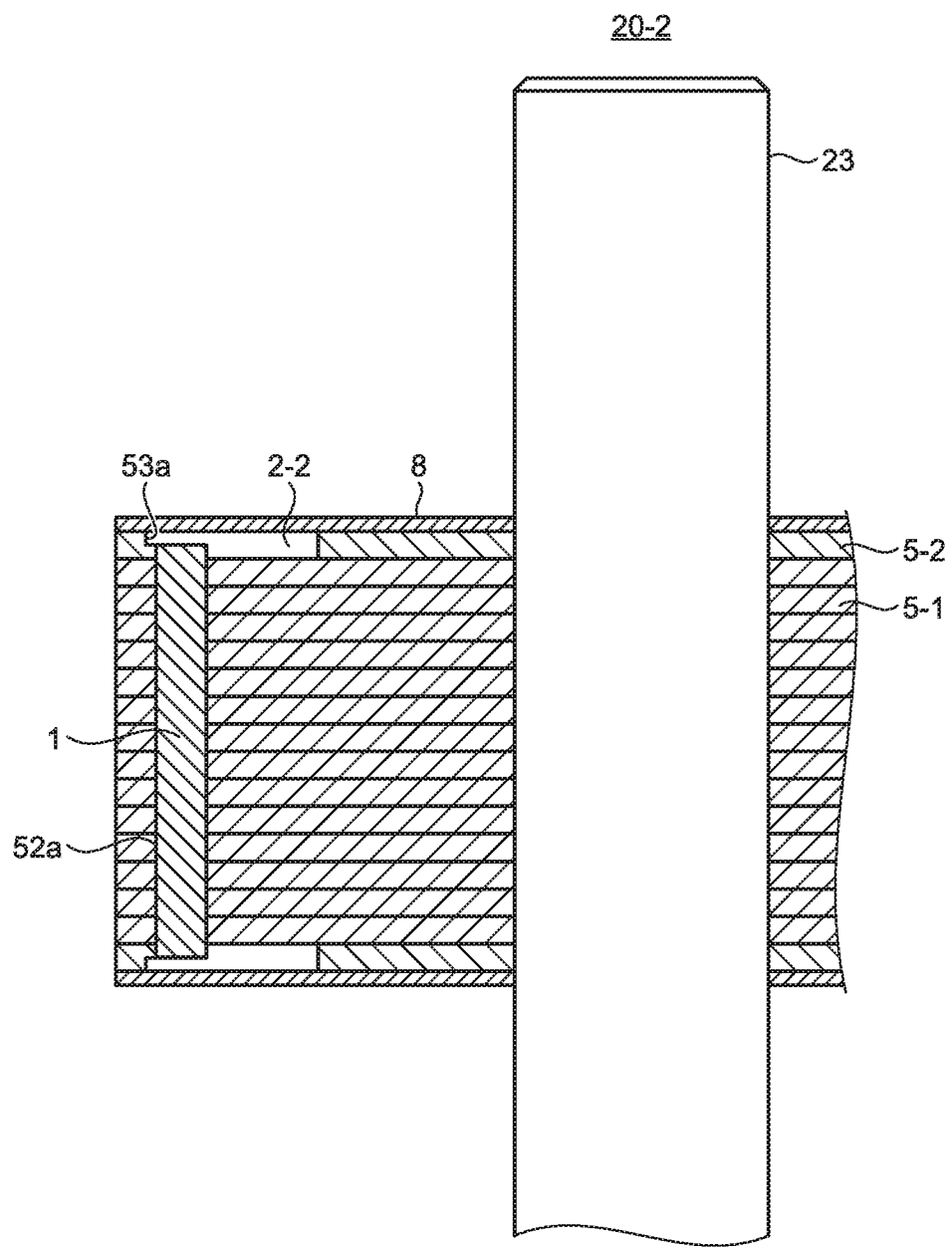
FIG. 13 is a diagram illustrating a second modification of the consequent-pole-type rotor according to the first embodiment of the present invention.

FIG. 13 is a diagram illustrating a second modification of the consequent-pole-type rotor according to the first embodiment of the present invention. A difference between the rotor 20 illustrated in FIG. 6 and a rotor 20-2 illustrated in FIG. 13 is the shape of the second rotor core 5-2. In the second rotor core 5-2 included in the rotor 20-2, the radially outer side surface 53a is closer to the outer circumferential surface of the second rotor core 5-2 than the radially outer side surface 52a. In the rotor 20-2 configured in this manner, the leakage flux of the short loop a is suppressed as compared with that in the rotor 20A illustrated in FIG. 10.

However, in the rotor 20-1 illustrated in FIG. 12, magnetic resistance against the magnetic flux leaking from the permanent magnet 1 is lowered as compared with that in the rotor 20 illustrated in FIG. 6. Further, in the rotor 20-2 illustrated in FIG. 13, a flow of magnetic flux generated from the permanent magnet 1 and flowing to a stator not illustrated is disturbed by the second magnet insertion hole 2-2.

Therefore, it is desirable that the position of the radially outer side surface 53a in the radial direction coincides with the position of the radially outer side surface 52a in the radial direction, as in the rotor 20 illustrated in FIG. 6. Due to this arrangement, the leakage flux of the short loop a illustrated in FIG. 10 is suppressed, magnetic force interlinking with a coil of a stator not illustrated is increased, and induced voltage is increased. Accordingly, a motor torque is increased, so that it is possible to achieve the electric motor 100 that is compact and is highly efficient.

Further, since the rotor 20 illustrated in FIG. 6 is configured in such a manner that the axial length L is longer than the axial length L2 of the permanent magnet 1, it is possible to prevent the permanent magnet 1 from being broken by contact with the end plate 8 when the end plate 8 is attached.

Figure 14:
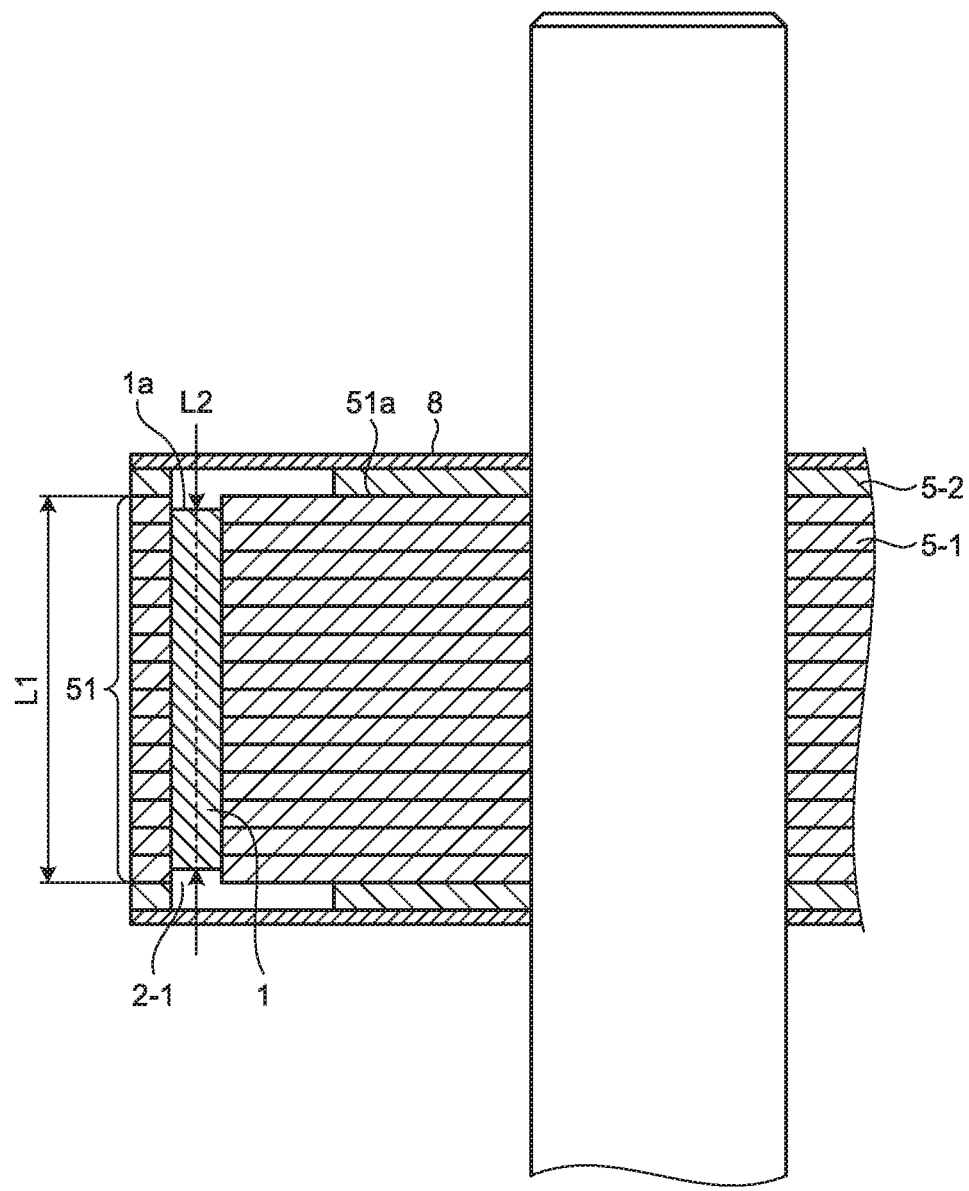
FIG. 14 is a diagram illustrating a third modification of the consequent-pole-type rotor according to the first embodiment of the present invention.

FIG. 14 is a diagram illustrating a third modification of the consequent-pole-type rotor according to the first embodiment of the present invention. A difference between the rotor 20 illustrated in FIG. 6 and a rotor 20-3 illustrated in FIG.

14 is the axial length L2 of the permanent magnet 1. In the rotor 20-3, the axial length L2 of the permanent magnet 1 is shorter than the axial length L1 of the rotor core block 51, and the axial end surface 1a of the permanent magnet 1 is located to be closer to the first rotor core 5-1 than the axial end surface 51a of the rotor core block 51. In the rotor 20-3 configured in this manner, the leakage flux of the short loop a is suppressed as compared with that in the rotor 20A illustrated in FIG. 10.

Figure 15:
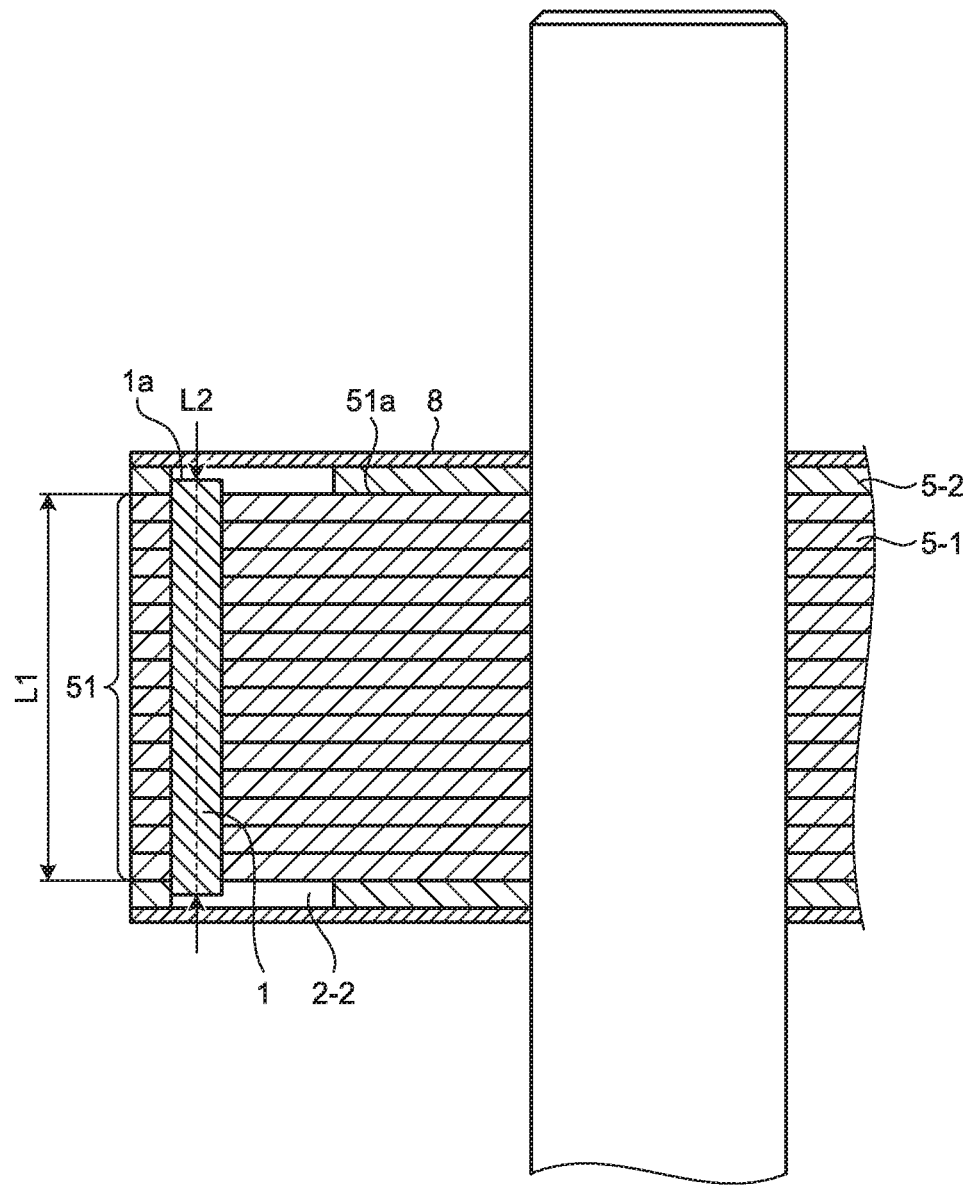
FIG. 15 is a diagram illustrating a fourth modification of the consequent-pole-type rotor according to the first embodiment of the present invention.

FIG. 15 is a diagram illustrating a fourth modification of the consequent-pole-type rotor according to the first embodiment of the present invention. A difference between the rotor 20 illustrated in FIG. 6 and a rotor 20-4 illustrated in FIG. 15 is the axial length L2 of the permanent magnet 1. In the rotor 20-4, the axial length L2 of the permanent magnet 1 is longer than the axial length L1 of the rotor core block 51, and the axial end surface 1a of the permanent magnet 1 is located to be closer to the end plate 8 than the axial end surface 51a of the rotor core block 51. In the rotor 20-4 configured in this manner, the leakage flux of the short loop a is suppressed as compared with that in the rotor 20A illustrated in FIG. 10.

However, in the rotor 20-3 illustrated in FIG. 14, a short loop of magnetic flux can be easily generated via the first magnet insertion hole 2-1 of the first rotor core 5-1. Further, in the rotor 20-4 illustrated in FIG. 15, it is not possible to effectively use magnetic flux generated from the permanent magnet 1 protruding into the second magnet insertion hole 2-2 of the second rotor core 5-2.

Therefore, it is desirable that the axial end surface 1a of the permanent magnet 1 coincides with the axial end surface 51a of the rotor core block 51, as in the rotor 20 illustrated in FIG. 6. Due to this arrangement, the leakage flux of the long loop b illustrated in FIG. 10 is suppressed, magnetic force interlinking with a coil of a stator not illustrated is increased, and induced voltage is increased. Accordingly, a motor torque is increased, so that it is possible to achieve the electric motor 100 that is compact and is highly efficient.

Figure 16:
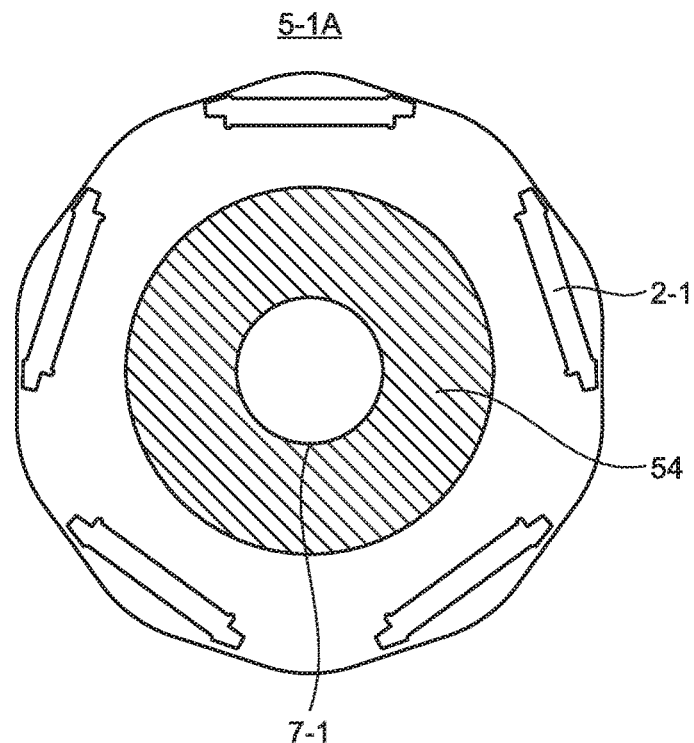
FIG. 16 is a first explanatory diagram of a fifth modification of the consequent-pole-type rotor according to the first embodiment of the present invention.

FIG. 16 is a first explanatory diagram of a fifth modification of the consequent-pole-type rotor according to the first embodiment of the present invention. FIG. 16 illustrates a first rotor core 5-1A obtained by modifying the first rotor core 5-1 illustrated in FIG. 7. In the first rotor core 5-1A, a resin 54 is filled between the shaft insertion hole 7-1 and the first magnet insertion holes 2-1.

Figure 17:
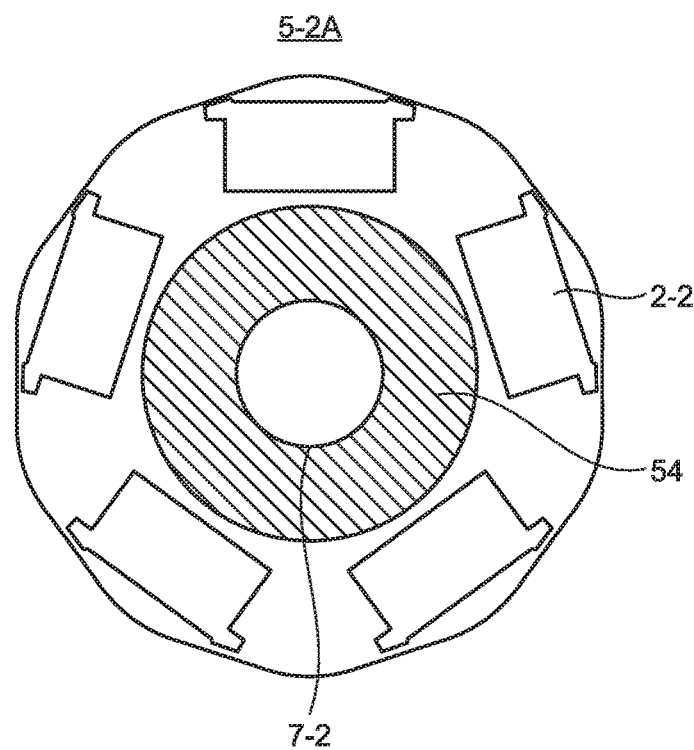
FIG. 17 is a second explanatory diagram of the fifth modification of the consequent-pole-type rotor according to the first embodiment of the present invention.

FIG. 17 is a second explanatory diagram of the fifth modification of the consequent-pole-type rotor according to the first embodiment of the present invention. FIG. 17 illustrates a second rotor core 5-2A obtained by modifying the second rotor core 5-2 illustrated in FIG. 8. In the second rotor core 5-2A, the resin 54 is filled between the shaft insertion hole 7-2 and the second magnet insertion holes 2-2.

Figure 18:
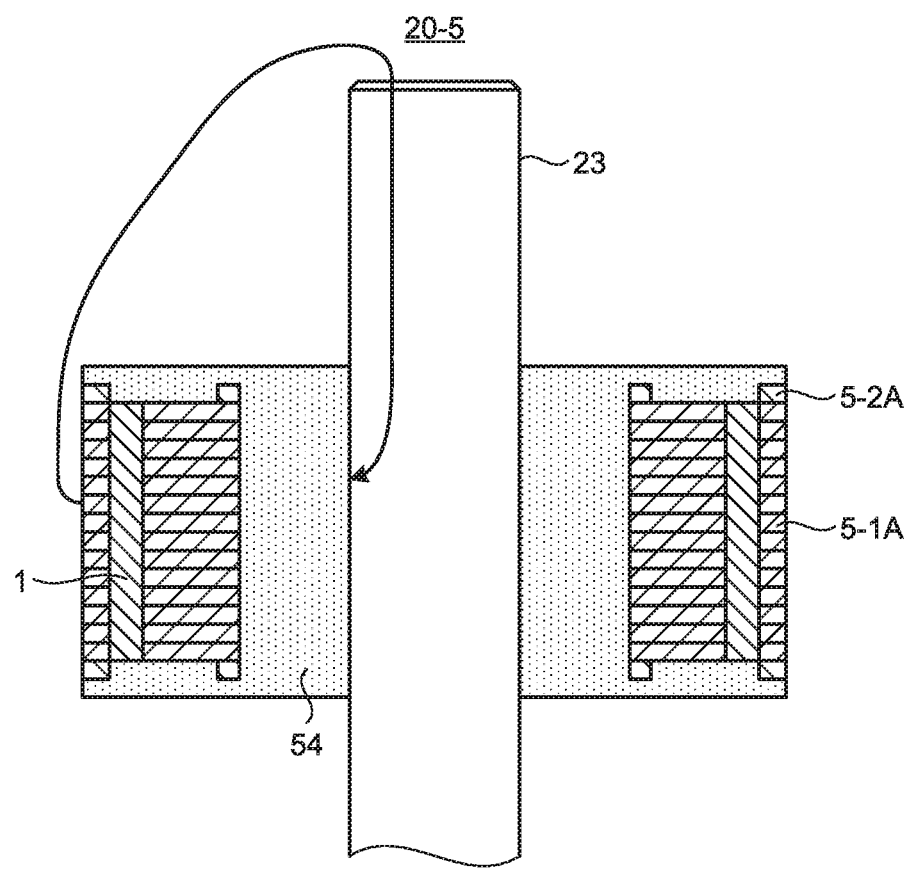
FIG. 18 is a third explanatory diagram of the fifth modification of the consequent-pole-type rotor according to the first embodiment of the present invention.

FIG. 18 is a third explanatory diagram of the fifth modification of the consequent-pole-type rotor according to the first embodiment of the present invention. FIG. 18 illustrates a rotor 20-5 configured by the first rotor core 5-1A and the second rotor core 5-2A respectively illustrated in FIGS. 16 and 17. The rotor 20-5 is manufactured by integrally molding the shaft 23, the first rotor core 5-1A, the second rotor core 5-2A, and the resin 54 with a mold not illustrated. By using the resin 54, it is possible to suppress the short loop a and the long loop b of magnetic flux generated from the permanent magnet 1. Further, since the permanent magnet 1 is covered with the resin 54 when the rotor 20-5 is integrally molded, it is possible to prevent contact of oxygen and hydrogen with the permanent magnet 1, so that degradation of magnetic force caused by corrosion of the permanent magnet 1 can be prevented. Furthermore, with the rotor 20-5, it is possible to reduce the used amount of a core member, thereby realizing reduction in cost.

Figure 19:
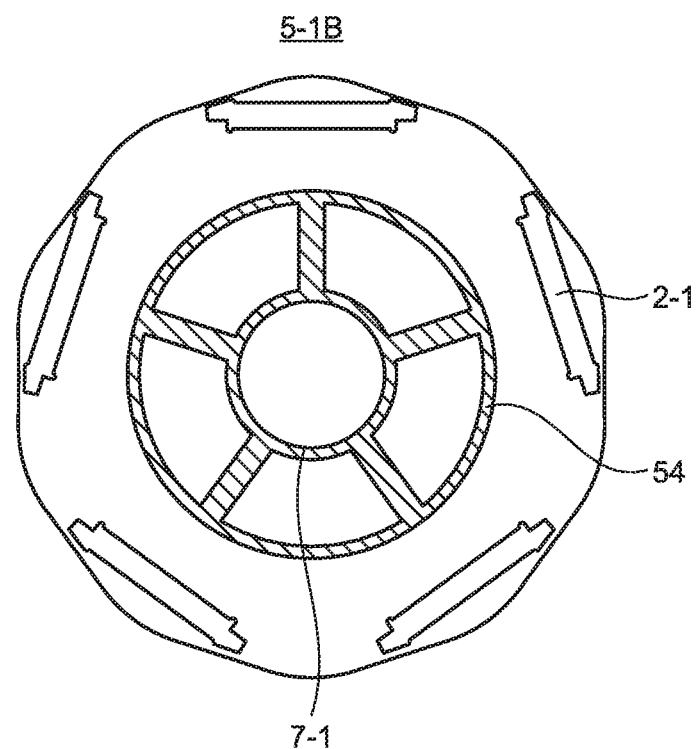
FIG. 19 is an explanatory diagram of a sixth modification of the consequent-pole-type rotor according to the first embodiment of the present invention.

FIG. 19 is an explanatory diagram of a sixth modification of the consequent-pole-type rotor according to the first embodiment of the present invention. FIG. 19 illustrates a first rotor core 5-1B obtained by modifying the first rotor core 5-1 illustrated in FIG. 7. In the first rotor core 5-1B, the resin 54 that is rib-shaped is filled between the shaft insertion hole 7-1 and the first magnet insertion holes 2-1. By adjusting the radial width and the axial length of the resin 54, it is possible to adjust the natural frequency of a rotor not illustrated, which includes the first rotor core 5-1B, so that it is possible to adjust torsional resonance with a fan not illustrated, which is connected to the rotor.

Although the first embodiment has described an example in which the second rotor core is provided on both ends of a rotor core block in the axial direction, the same effects can be obtained also when the second rotor core is provided on one end of the rotor core block in the axial direction.

Second Embodiment

Figure 20:
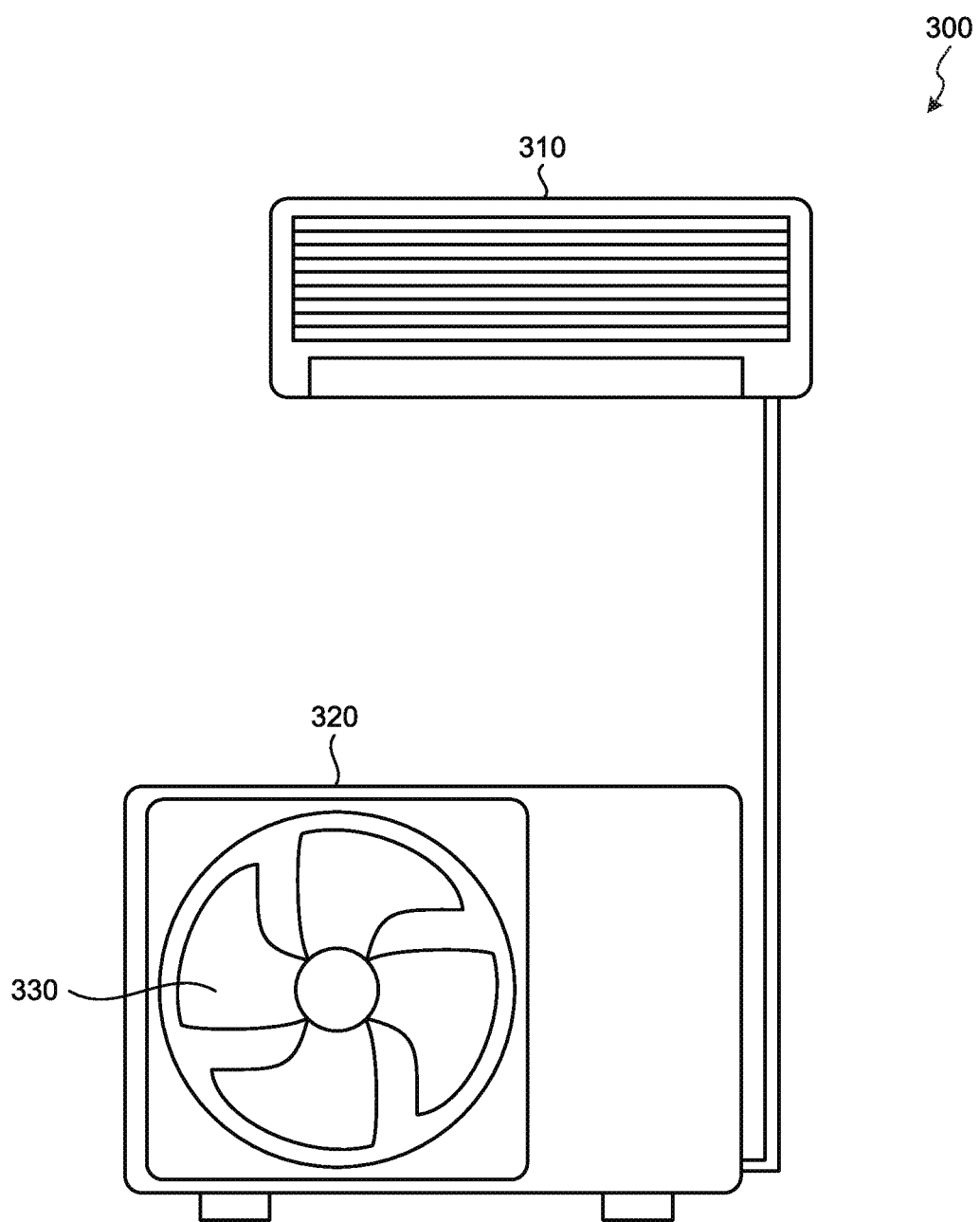
FIG. 20 is a diagram illustrating an example of a configuration of an air conditioner according to a second embodiment of the present invention.

FIG. 20 is a diagram illustrating an example of the configuration of an air conditioner according to a second embodiment of the present invention. An air conditioner 300 includes an indoor unit 310 and an outdoor unit 320 connected to the indoor unit 310. An indoor unit blower not illustrated is mounted in the indoor unit 310, and an outdoor unit blower 330 is mounted in the outdoor unit 320. A compressor not illustrated is mounted in the outdoor unit 320. For the indoor unit blower, the outdoor unit blower 330, and the compressor, the electric motor 100 according to the first embodiment is used.

In this way, by using the electric motor 100 according to the first embodiment as a driving source of the indoor unit blower, the outdoor unit blower 330, and the compressor and by effectively using the leakage flux, the operating efficiency of the air conditioner 300 can be improved.

Note that the electric motor 100 according to the first embodiment can be mounted in an electric apparatus other than the air conditioner 300, and also in this case, can provide the same effects as in the present embodiment.

The configurations illustrated in the above embodiments illustrate an example of the subject matter of the present invention, and can be combined with another known art, and can be partly omitted or changed without departing from the scope of the present invention.

REFERENCE SIGNS LIST 1 permanent magnet; 1a axial end surface; 2 magnet insertion hole; 2-1 first magnet insertion hole; 2-second magnet insertion hole; 3A first region; 3B, 4B region; 4A second region; 5 rotor core; 5-1, 5-1A, 5-1B first rotor core; 5-2, 5-2A second rotor core; 6 rotation axis; 7-1, 7-2 shaft insertion hole; 8 end plate; 10 molded stator; 10-1, 41-1 outer peripheral portion; 10-2, 10a, 41-2 inner peripheral portion; 10b opening; 11 bearing support; 11a hole; 20, 20-1, 20-2, 20-3, 20-4, 20-5, 20A rotor; 21a load-side rolling bearing; 21b opposite-to-load-side rolling bearing; 23 shaft; 24 resin portion; 26, 26-1, 26-2 insulating sleeve; 27 shaft assembly; 30 bracket; 30a bearing support; 30b press-fitted portion; 40 stator; 41 stator core; 42 coil; 43 insulating portion; 44b neutral terminal; 45 substrate; lead exit part; 47 lead; 49a, 49b hall IC; 50 mold resin; 51 rotor core block; 51a axial end surface; 52 first core portion; 52a radially outer side surface; 53 second core portion; 53*a* radially outer side surface; 54 resin; 60 first magnetic pole portion; 61 second magnetic pole portion; 62, 63 pole center; 64 interpole space; 100 electric motor; 110 load side; 120 opposite-to-load side; 300 air conditioner; 310 indoor unit; 320 outdoor unit; 330 outdoor unit blower; 400 core segment; 401 back yoke; 402 tooth; 403 thin-walled portion; 404 split surface; 405 hole; 406 slot.

The invention claimed is:

1. A consequent-pole-type rotor comprising a rotor core and a permanent magnet disposed inside the rotor core, wherein
the rotor core comprises:
a first rotor core having a first region into which the permanent magnet is inserted; and
a second rotor core having a second region communicating with the first region, the second rotor core being stacked on the first rotor core, and
a second width is larger than a first width, where the first width is a width of the first region in a radial direction of the rotor core and the second width is a width of the second region in the radial direction,
the first rotor core includes
a first magnet insertion hole having the first region, and
a first core portion provided on an outer side of the radial direction relative to the first magnet insertion hole,
the second rotor core includes
a second magnet insertion hole having the second region, and
a second core portion provided on an outer side of the radial direction relative to the second magnet insertion hole, and
a position of a radially inner side surface of the second core portion in the radial direction coincides with a position of a radially inner side surface of the first core portion in the radial direction.

2. The consequent-pole-type rotor according to claim 1, wherein the second rotor core is stacked at one end or both ends of the first rotor core in an axial direction of the rotor core.

3. The consequent-pole-type rotor according to claim 1, wherein a position of an axial end surface of the first rotor core in an axial direction of the rotor core coincides with a position of an axial end surface of the permanent magnet in the axial direction of the rotor core.

4. The consequent-pole-type rotor according to claim 1, wherein the first rotor core, the second rotor core, and a shaft are integrally molded by using a resin.

5. An electric motor comprising the consequent-pole-type rotor according to claim 1 and a stator.

6. An air conditioner comprising the electric motor according to claim 5.

* * * * *